United States Patent

[11] 3,581,889

[72] Inventors Bruce C. Abraham
Reading;
Charles R. Fegley, Laureldale; Robert L. Sels, Reading, all of, Pa.
[21] Appl. No 846,110
[22] Filed July 30, 1969
[45] Patented June 1, 1971
[73] Assignee Western Electric Company, Incorporated
New York, N.Y.

[54] METHODS OF AND APPARATUS FOR FEEDING, TESTING, AND SORTING ARTICLES
10 Claims, 7 Drawing Figs.

[52] U.S. Cl. ............................................. 209/74, 209/81
[51] Int. Cl. ............................................. B07c 5/00
[50] Field of Search ............................................. 209/74, 81, 111.8

[56] References Cited
UNITED STATES PATENTS
2,617,527  11/1952  Smith    209/81(X)
3,450,259   6/1969  Waltz    209/74

Primary Examiner—Richard A. Schacher
Assistant Examiner—Gene A. Church
Attorneys—H. J. Winegar, R. P. Miller and R. Y. Peters ABSTRACT: An article, such as a magnetically leaded device, can be carried by a carrier wheel from an input position to a testing location where the article is tested and classified into one of a plurality of categories in accordance with the test. The characteristics of a test, for each category, are stored in a corresponding shift register. The carrier wheel transports the articles past a number of force-field producing elements such as electromagnets which are activated by the corresponding outputs of the shift registers. Activation of an elements removes the proximate article from the wheel so that it falls into an appropriate output chute into an output bin corresponding to the tested category.

PATENTED JUN 1 1971 3,581,889

INVENTORS
B.C. ABRAHAM
C.R. FEGLEY
R.L. SELS

BY
ATTORNEY

PATENTED JUN 1 1971 3,581,889
SHEET 2 OF 3
FIG.-4
FIG.-6
FIG.-5
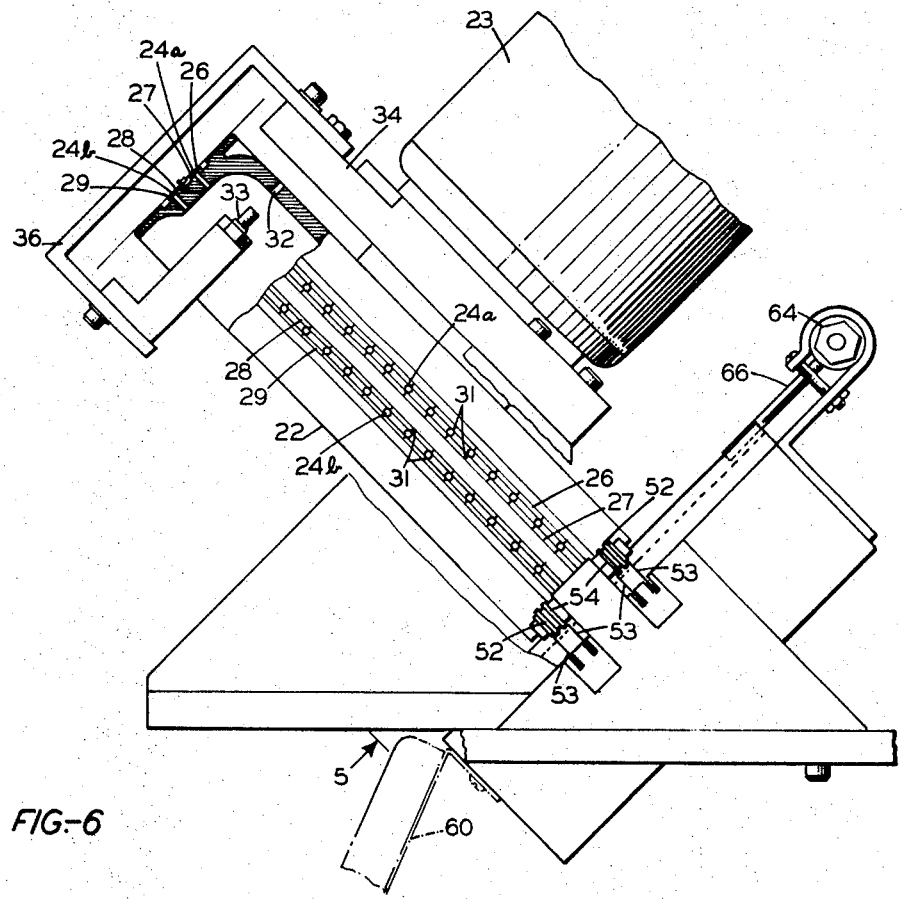
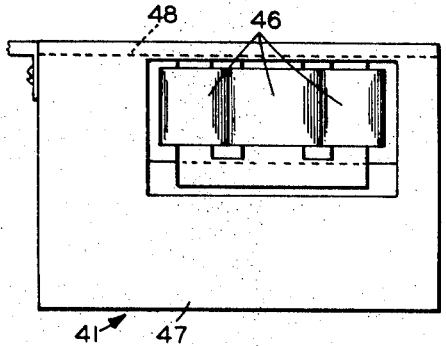
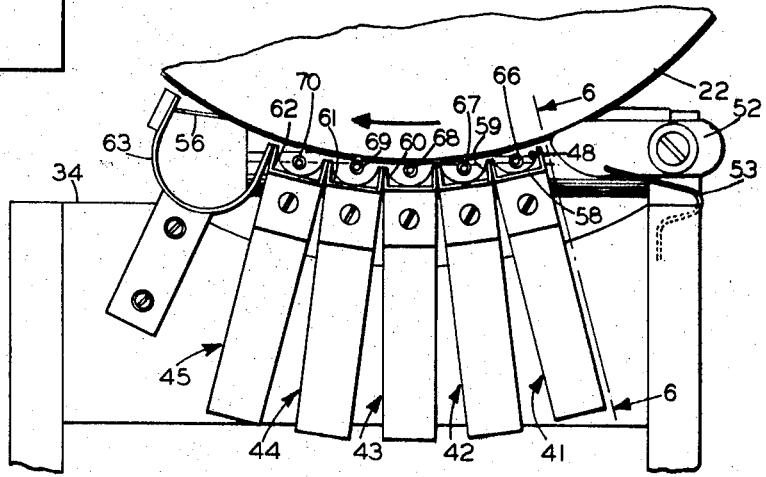

METHODS OF AND APPARATUS FOR FEEDING, TESTING, AND SORTING ARTICLES

BACKGROUND OF THE INVENTION

This invention relates to improvements in the feeding, testing, and sorting of articles. In particular, the invention is directed to the feeding, testing, and sorting of devices having a body and opposed axial leads, for example: semiconductor diodes, resistors, capacitors, and the like. Accordingly, the general objects of the invention are to provide new and improved apparatus and methods of such character.

It is desired, generally, to test a number of articles in accordance with certain characteristics thereof and to sort or segregate those having similar characteristics. For example, it may be desirable to sort a plurality of diodes so that, in one category, good diodes come within a 2 percent variation from a nominal value; in a second category, good diodes differ from the nominal value by 10 percent; and, in a third category, all remaining diodes, good and bad.

Techniques, which were suggested by the prior art, for feeding, testing, and sorting articles either lack versatility or are too slow for present day high-speed, high-volume production requirements.

In U.S. Pat. No. 2,183,606, to Day, issued Dec. 19, 1939, article sorting is described, wherein articles, such a continuous inflow of beans, are placed from a large reservoir into a hopper. A suction carrier wheel cooperates with the hopper and forms a closure for the arcuate open delivery mouth thereof. The beans seat themselves one by one on a suction socket and emerge carried on the periphery of the wheel from a limited delivery opening. The beans that are carried by the wheel are both good and bad, the demarcation between good and bad being determined by color. The test of relative goodness is made between each bean progressively carried by the wheel and a standard or bogey bean mounted stationary on a suitable support in proper relation to an optical system. When one of the beans being carried by the suction wheel for test does not match up to the standard bean within the desired limits, a kicker lever of an electrically operated discharge mechanism throws it off its suction seat and causes it to fall over a discard barrier. Standard beans seated on the suction seats pass through a notch of this barrier and are stripped from their suction sockets by a stripper to fall into a bag.

In a copending U.S. Pat. application by J. E. Beroset and D. M. Large, Ser. No. 763,860, filed Sept. 30, 1968, and assigned to the assignee of this application, there is disclosed a magnetic storage bin in which a plurality of elongated magnetic articles, such as diodes, are suspended in the bin and are caused to migrate toward the front of the bin due to a variable flux density along the length thereof. A rotary member communicates with the input bin so as to attract and hold the articles thereon. The articles are subsequently tested and stripped from the member by known means.

Others in the art have suggested the removal of articles from turret mechanisms by various techniques, such as by stripping, by cam operated mechanisms, and by utilization of solenoid actuated ejectors. However, prior art techniques including cams and solenoid actuated ejecting mechanisms are slow, and hence, the maximum rate of a feed, test, and sort operation is severely limited due to the mechanical response, or inertia, of such mechanisms. Furthermore, mechanical ejectors are subject to undue wear, requiring frequent maintenance.

Accordingly, it is an object of this invention to provide novel methods and apparatus for quickly feeding, testing, and sorting articles. Another object of this invention is to provide novel methods and apparatus for rapidly feeding, testing, and sorting leaded devices into a plurality of different categories.

SUMMARY OF THE INVENTION

In accordance with one embodiment of this invention, a carrier wheel holds a number of articles spaced about its periphery. The articles are tested, one at a time, at a test position in proximity with the periphery of the wheel, so that a tested article is classified in one of a plurality of different categories. The wheel is indexed at the rate of one article at a time. At least one force-field producing element such as an electromagnet in proximity to the periphery of the wheel, and spaced about the circumference thereof, removes a tested article therefrom when energized. A memory, which stores the classifications of the tested articles, is coupled to energize the element to remove articles classified in a given category to a corresponding element.

In a preferred embodiment, the carrier wheel is oriented for rotation about a center axis aligned at an angle of 30° to 75° to the horizontal plane. In another embodiment, a quantity of force-field producing elements are used, one less in number than the plurality of different categories, together with mechanical stripping means in cooperation with the wheel for stripping held tested articles off the wheel which were not otherwise removed by the elements.

In accordance with a more specific embodiment of the invention, a stationary magnetic input bin holds a number of magnetically leaded devices having a body and opposed axial leads. The bin substantially supports each of the devices along axes parallel to each other, the axes being oriented at an angle lying between 30° and 75° with the horizontal plane. An opaque drumlike member, in cooperating relationship with the bin and having a circumferential periphery and opposed ends, is rotatable about an axis parallel to the parallel axes. The drumlike member includes a plurality of pairs of permanent magnets for attracting and holding the leaded devices. The magnets are imbedded in the member and are equally spaced about the periphery thereof, the two magnets of each pair being aligned with their radially extending poles oriented along a line parallel to the parallel axes. The radially extending poles of each pair of magnets are of opposite polarity. Each pair of permanent magnets has associated therewith, on the periphery of the drumlike member, a grooved lead retaining and orienting configuration for maintaining held devices in parallel alignment with the parallel axes. Light transmitting passageways, equal in number to and respectively associated with the pairs of magnets, are provided through the drumlike member, from end to end, parallel to the axes. The passageways are oriented on a circular locus having a center which coincides with the axis of rotation of the member.

A light photocell system, associated with the drumlike member and cooperating with the light transmitting passageways, is coupled in such a manner to stop the rotation of the member when light passes therethrough.

A test set, for testing the leaded devices, is coupled to a pair of power probe leads and a pair of test probe leads which are maintained at an associated test position for engaging a leaded device therewith. The test set initiates testing upon receipt of a "test start" signal, which is generated following the passage of light through one of the passageways, and provides an "output bin command" signal upon an appropriate output thereof and a "test complete" signal upon completion of testing of each device.

A pulse generator provides a "shift" signal to each of a plurality of shift registers upon the receipt of the "test complete" signal. The number of shift registers corresponds in number to the appropriate outputs of the test set, wherein each of the registers has a different number of stages. The "test complete" signal is coupled to cause the drumlike member to commence rotation.

A plurality of output bins, and associated output chutes, are provided, corresponding in number to the appropriate outputs of the test set. An electromagnet, in cooperating relationship with each chute, is oriented in proximity to the periphery of the drumlike member. Each electromagnet has a axis parallel to the parallel axes and, when energized, removes its proximate device from that member so that it falls through the associated chute into the proper bin.

A number of two-input AND gates, one for each electromagnet, is provided having the output of each gate coupled to its corresponding electromagnet. One input of each gate is activated in response to the light and photocell system when light passes through one of the passageways. The other inputs are coupled to corresponding outputs of the shift registers.

A stationary stripping device, which cooperates with the grooved configuration, strips the held tested devices off the drumlike member which were not otherwise removed by one of the electromagnets so that they fall through a separate output chute into an additional output bin.

In addition, airflow is directed in a downwardly direction and parallel to the axes, between the member and the electromagnets, for assisting the removal of tested devices from the member.

In accordance with another embodiment of the invention, a method for feeding, testing, and sorting articles includes carrying a number of the articles about an arcuate path. One article is tested at a time, at one location about the path, so that the tested article is classified into one of a plurality of different categories. The classifications of the tested articles are stored and the tested articles are removed from the path, at a like plurality of positions therealong, in accordance with the stored classifications of the tested articles.

More specifically, in accordance with another embodiment of the invention, a number of magnetically leaded devices are suspended at an input location along axes substantially parallel to each other, the axes being oriented at an angle lying between 30° and 75° with the horizontal plane. The devices are transported from the input location through a circular arc having a center axis parallel to the parallel axes, while maintaining the transported devices in a parallel alignment with the aforesaid axes. The devices are tested one at a time, at a test position in proximity with the circular arc. The tested articles are electromagnetically removed from the path at a plurality of positions therealong in accordance with characteristics of the test. The removed articles are deposited onto output chutes, aligned with the axes, so that the removed articles travel therealong due to the incline of the chutes with the horizontal plane. A flow of air is directed downwardly parallel to the axes, and tangential to the arc, for assisting the removal of tested articles from the path.

BRIEF DESCRIPTION OF THE DRAWINGS

Other objects, advantages and features of the invention will be apparent from the following detailed description of a specific embodiment thereof, when taken in conjunction with the appended drawings, in which:

FIG. 4 is a partial view of the apparatus, partly in cross section, taken along the line 4-4 of FIG. 2;

FIG. 5 is a partial view of the apparatus taken along the line 5-5 of FIG. 4;

FIG. 6 includes a view of an electromagnet, including its associated windings and housing, taken along the line 6-6 of FIG. 5.

DETAILED DESCRIPTION

The operation and construction of a specific embodiment of this invention will be more fully understood from the following description of the various component parts.

THE CABINET

Figure 1:
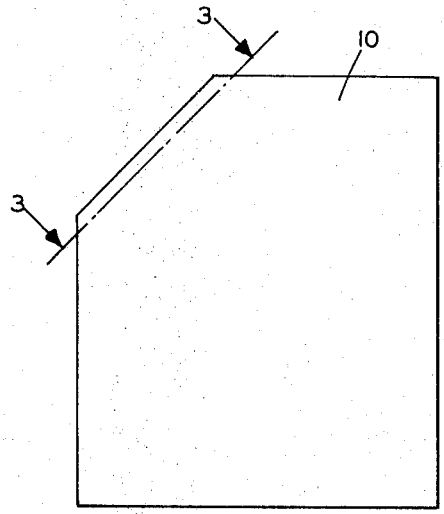
FIG. 1 is a side view of a cabinet which contains apparatus in accordance with a specific embodiment of this invention.
Figure 2:
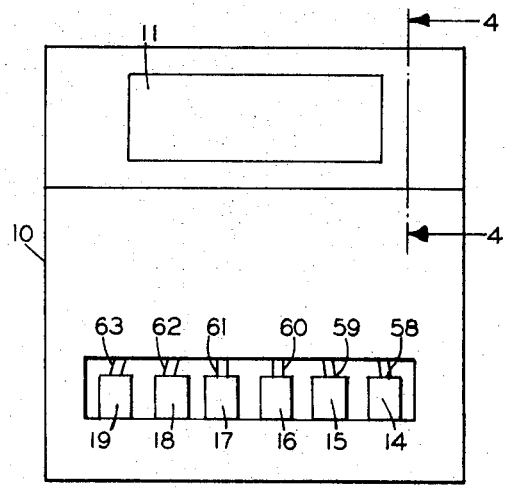
FIG. 2 is a front view thereof.
Figure 3:
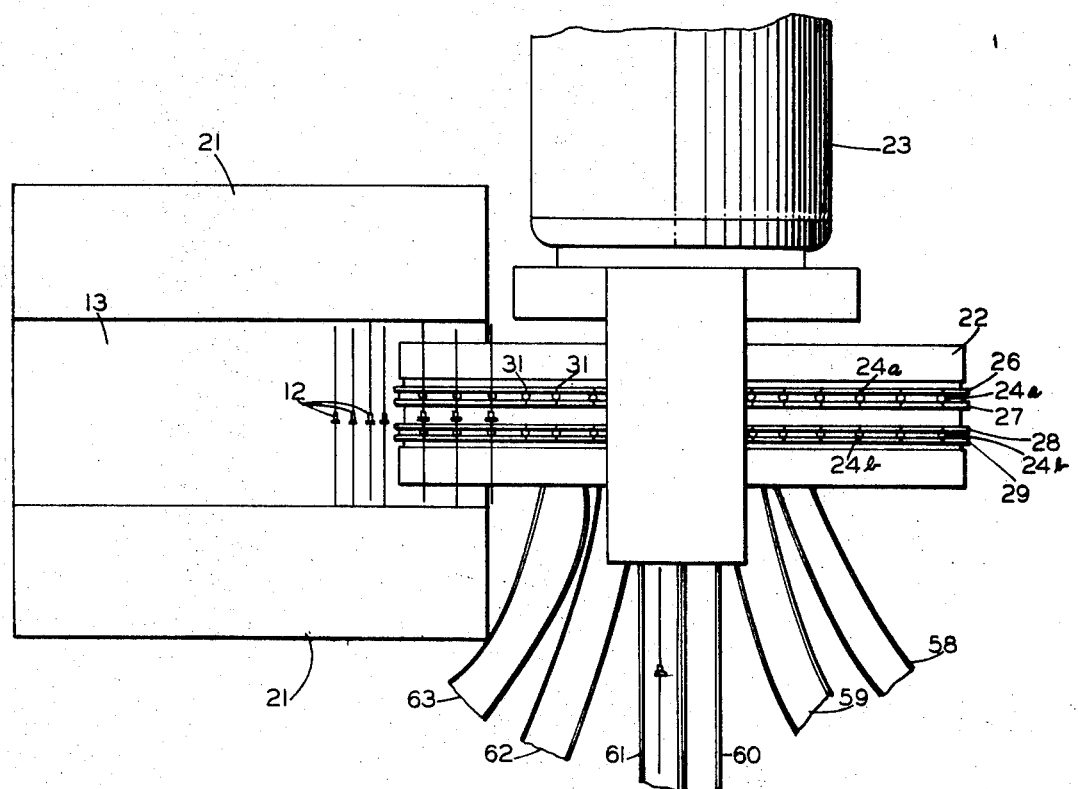
FIG. 3 is a partial view of the apparatus taken along the line 3-3 of FIG. 1.

Referring to the drawings, especially FIGS. 1 and 2, there is shown a cabinet 10 (not to scale) for housing a specific embodiment of this invention. A sliding door 11 on the cabinet 10 provides for a convenient opening to enable an operator to place paramagnetically leaded articles 12 into an input bin (FIG. 3). After the articles 12 are tested, they are sorted into a plurality of output bins 14, 15, 16, 17, 18, and 19 located at the bottom of the cabinet (FIG. 2).

Various elements of the embodiment described involve various axes being parallel to each other and at an angle of 30° to 75° (preferably, 45°) with the horizontal plane. Hence, the view of FIG. 3 is taken, looking into the cabinet of FIG. 1 along a 45° angle, whereby the FIG. 3 view presents various components of the apparatus orthogonally displayed.

MAGNETIC INPUT BIN

Referring to FIG. 3, a plurality of magnetically leaded devices 12, such as diodes having a body and two opposed axial magnetic leads, are placed by an operator between the opposed magnetic walls 21-21 of the input magnetic bin 13. The devices 12 are suspended in parallel fashion between the walls 21-21 of the magnetic bin 13, each suspended device repelling its adjacent device so that they do not intertwine.

Preferably, the input magnetic bin 13 has magnetic properties such that the devices tend to congregate at one end of the bin, for example, at the right end as viewed in FIG. 3. Such properties can be produced by providing a tapered magnetic field along the length of the magnetic bin, such as, for example, described in the aforesaid copending application by J. E. Beroset and D. M. Large.

Elongated magnets, not shown, within the walls 21-21 can be supported so that they are closer to each other at the right end of the bin 13, nearest to a magnetic drumlike member 22. Consequently, the diodes tend to congregate near that end of the bin 13 where the magnetic filed is strongest and against the drumlike member 22.

The devices 12 are magnetically suspended between the walls 21-21 of the magnetic input bin 13 at an angle of 45° with horizontal plane.

MAGNETIC DRUMLIKE MEMBER

The magnetic drumlike member 22, shown in FIGS. 3 and 4, acts as a carrier wheel, and rotates about an axis parallel to the axis of the suspended magnetic devices 12, at an angle of 45° with the horizontal plane. The drumlike member 22 is directly fixed to the shaft of a stepping motor 23 for indexing the member 22 one position at a time.

The drumlike member 22 includes a plurality of pairs of magnets 24a, 24b equally spaced about the periphery thereof. The magnets are imbedded into the drumlike member 22 so that their radially extending poles are recessed from the peripheral surface of the member 22 by a short distance, such as 0.030 inch, so that the magnets 24a, 24b, per se, do not physically contact the leads of the devices 12.

The radially extending poles of the two magnets of each pair are of opposite polarity so that they more effectively attract a leaded device 12 from the input bin 13.

Associated with each pair of magnets 24a, 24b about the drumlike member 22 are "grooved lead retaining and orienting means" to assure that a device 12, picked up and held by the magnets, is oriented parallel to the aforesaid axes at an angle of 45° with the horizontal plane.

A "grooved lead retaining and orienting means," in a preferred embodiment, includes four raised rings 26, 27, 28, 29 around the circumference of the drumlike member 22. The raised rings 26, 27, 28, 29 have notches 31-31 cut in them at spaced intervals around the circumference of the drumlike member 22. The magnets 24a, 24b are positioned between the pairs of rings 26, 27, and 28, 29, respectively, and are aligned with the notches 31-31. The circumferential recesses, between the raised rings 26, 27, and 28, 29, are provided to enable the devices 12 to be mechanically stripped from the drumlike member 22 as described hereinafter.

The drumlike member 22 is provided with a plurality of light transmitting passageways, such as holes 32, in a circular locus through the ends of the member. These holes 32, optionally, can be filled with a light transmitting material to provide for increased rigidity of the drumlike member 22.

THE STEPPING MOTOR

The stepping motor 23, shown in FIGS. 3 and 4, is directly coupled to the shaft of the magnetic drumlike member 22 for indexing the member 22 one index position at a time. The stepping motor 23 may include a synchronous induction motor such as that described in an article entitled, "Characteristics of a Synchronous Induction Motor" printed in applications and Industry, published by American Institute of Electrical Engineers, Mar. 1962. A stepping motor suitable for incorporation into the embodiment described, capable of stepping 200 times per revolution, is available under the trade designation "SLO-SYN" from the Superior Electric Company, Bristol, Connecticut.

LIGHT AND PHOTOCELL SENSING SYSTEM

As shown in FIG. 4, a light and photocell sensor 33 is mechanically affixed to the frame 34 by a bridge connecting arm 36 so that the light and photocell sensor 33 is in cooperating relationship with the holes 32 on the drumlike member 22.

THE ELECTROMAGNETS

A plurality of electromagnets 41, 42, 43, 44, 45 are spaced about the periphery of the drumlike member 22 as shown in FIG. 5. The windings 46 of each electromagnet (41, for example) are maintained in an individual housing 47, as shown in FIG. 5, so that, when energized, the magnetic flux of an individual electromagnet is directed along a preferred orientation, generating an attractive force directed toward the device 12 which is in proximate relation thereto. Those devices, which are supported on the drumlike member 22 and angularly displaced from an energized electromagnet, are unaffected by the limited magnetic field generated by an energized electromagnet.

The housing 47, for each electromagnet, has formed, along the side closest to the magnetic drumlike member 22 a grooved, curved path 48 formed from a low friction material, such as polytetrafloroethylene. Other materials, such as a low friction ceramic, can be used. The curved path 48, which forms a part of an output chute, is maintained at an axis, parallel to the other axes, of 45° with the horizontal plane.

In the embodiment described, a plurality of electromagnets is contemplated. In one operative embodiment, five electromagnets 41—45 are displaced about the periphery of the drumlike member 22, each being spaced one index position away from another.

THE TEST POSITION

The devices 12 are tested at a test position located in association with the drumlike member 22 prior to the tested device reaching any of the electromagnets. In the preferred embodiment, the devices are tested at one index position prior to the leading electromagnet 41.

Power is provided from a test set 51 to two power leads 52—52. The two power leads 52—52 are electrical wiping cams (see FIG. 5) which are spring 53 biased against the insulating surface of the drumlike member 22, and come into contact with the two opposed leads of a device 12 when it is in the test position.

Similarly, a pair of test leads 54—54, which are formed of spring biased camming members, are coupled to communicate with the two opposed leads of the device 12 when it is in the test position. Hence, when a device is in the test position, power can be applied through the device by the two power opposed leads 52—52 and test readings from the device 12 can be obtained via the test probes 54—54. When a device 12 is not in the test position, either during an intermediate position—or in the absence of a device held by a pair of magnets—the power leads 52—52 and the test leads 54—54 are insulated from one another.

MECHANICAL STRIPPER

A mechanical stripping mechanism includes a pair of leaf springs 56 which are coupled to the housing 33 in such a manner that the springs 56 ride in the recessed grooves (between the raised rings) of the magnetic drumlike member 22. A device 12 which has been tested, and which has not been removed by an energized electromagnet, is stripped off the drumlike member 22 by the leaf springs 56. The leaf springs 56 are located, in a preferred embodiment, one index position past the ultimate electromagnet 45.

OUTPUT BINS

As stated above, the output bins 14—19, as shown in FIG. 2, are oriented at the bottom of the cabinet 10. These output bins 14—19, in accordance with a preferred embodiment constructed by the inventors, are six in number. The bins 14—19 are, preferably, magnetic bins for supporting tested devices in a manner similar to the input bin 13 described hereinabove.

OUTPUT CHUTES

Output chutes 58, 59, 60, 61, 62 are coupled to the electromagnets 41, 42, 43, 44, 45, respectively, FIGS. 4 and 5, to provide a path to the output bins 14, 15, 16, 17, 18, respectively, FIG. 2, so that a tested device may pass along a chute to the appropriate output bin. A separate output chute 63 communicates with the leaf springs 56 of the stripping mechanism to direct devices 12 to the appropriate output bin 19.

An air manifold 64 behind the electromagnets 41—45 is provided with nozzles 66—70, respectively, for directing a constant stream of air towards the magnetic drumlike member 22 downwardly at a 45° angle with the horizontal plane along the curved paths 48 of the electromagnet housings 47. The airflow ensures that devices 12 that are picked off by an electromagnet from the drumlike member 22 are guided along the appropriate output chute to the output bin. In the absence of an airflow, a device which was attracted by an electromagnet may tend to bounce, upon deenergization of the electromagnet, and be reattracted by the permanent magnets 24a, 24b on the drumlike member 22. Another advantage of the airflow is that higher speeds are obtainable by ensuring that a tested device 12 is directed out of the way so that a subsequent tested device 12 can be readily removed from the drumlike member 22.

THE TEST SET

The test set 51 tests each device 12 on the drumlike member 22 for various characteristics. For example, it may test whether a particular device 12 is within 2 percent of a nominal value, whether the device is within 10 percent of a nominal value, whether it is within 20 percent of a nominal value, whether it has one particular type of electrical fault, whether it has another particular type of electrical fault, and the like. The test set 51 upon a control signal, such as a "test start" pulse, initiates the testing of a device 12. The test set 51 upon the completion of the testing automatically generates two signals. One signal is generated on a "test complete" line 71 and the second signal is generated on one of the five "bin command" lines 72, 73, 74, 75, 76. Thus, for example, if a test set 51 determines that a device 12 should be categorized in a third of the five categories, a signal is generated both on the test complete line 71 and on the "bin number three command" line 74.

OPERATION

In operation, devices 12, such as axially magnetically leaded diodes, are loaded into the magnetic storage bin 13 (FIG. 3) and, because of the characteristics of the magnetic walls 21—21 in the bin 13, work themselves against the drumlike member 22 which is rotated by the stepping motor 23. Since the diodes are bearing against the drumlike member 22, they are caught by the notches 31—31 in the raised rings 26—29 of the member 22 and held there by the permanent magnets 24a, 24b. A set of notches 31–31 accommodates only one diode at a time and, therefore, each set of notches 31–31 contains but one diode as the drumlike member 22 is stepped around.

Figure 7:
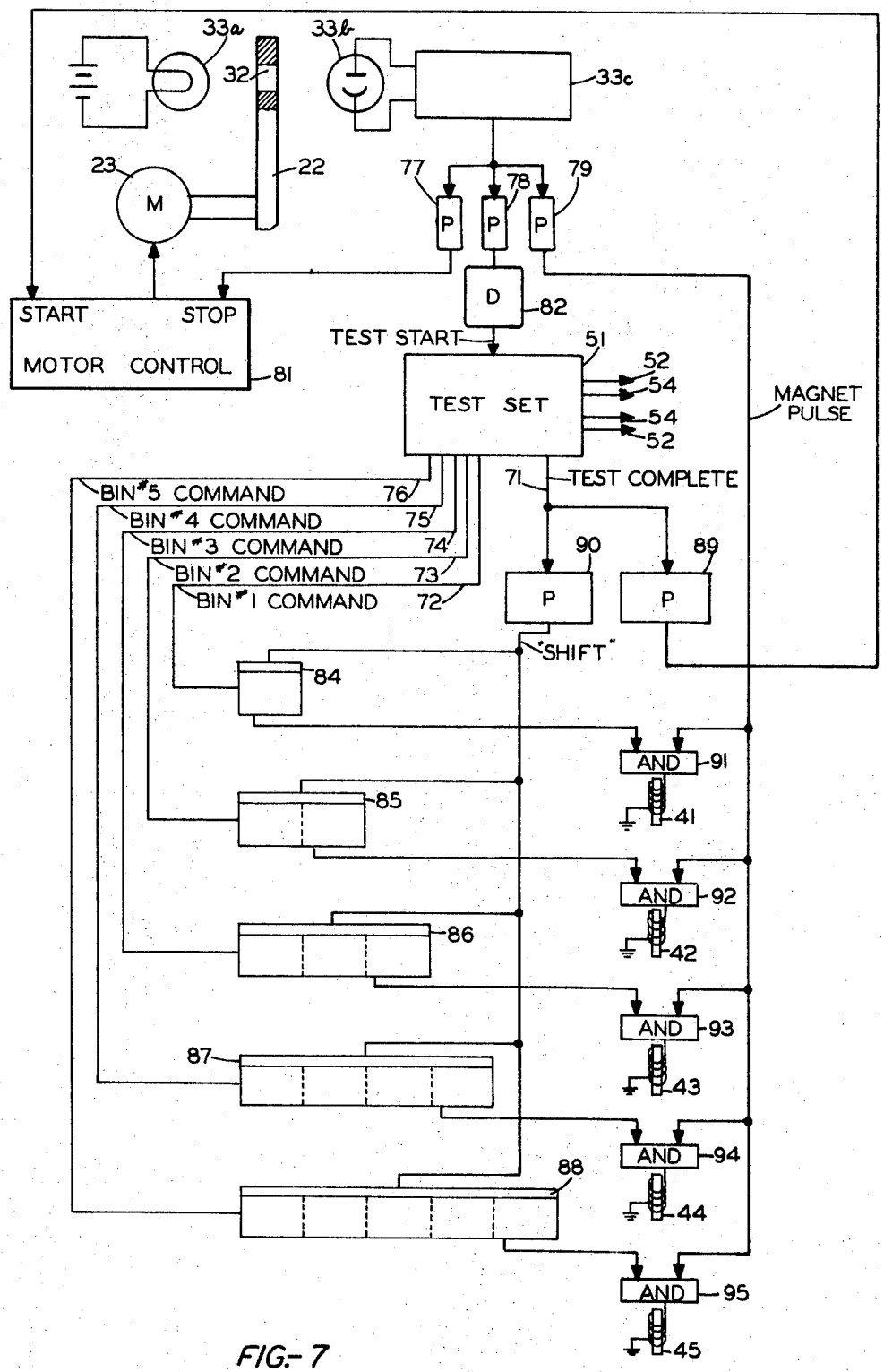
FIG. 7 is an electrical block diagram of a specific embodiment of this invention.

The operation of the embodiment will be more fully understood in conjunction with the electrical block diagram, shown in FIG. 7.

As the drumlike member 22 rotates to an index position, light passes from the lamp 33a through a light transmitting passageway 32 (aligned with a set of notches 31–31) on the member 22 to the photoelectric cell 33b, stopping the drumlike member 22 in the proper position, and initiating the test. Completion of the test starts the stepping motor 23, and, indexes the drumlike member 22, the next device stopping in position for test as determined, again, by the alignment of the light transmitting passageway 32 with the lamp photocell detection system 33.

Light received by the cell 33b is converted into electric current, and amplified at an amplifier 33c. The output of the amplifier 33c is coupled to three pulse generators 77, 78, 79 which may be, for example, "one-shot" multivibrators. A pulse from the pulse generator 77 is coupled to a motor control 81 to stop the motor 23 so that the drumlike member 22 is held fixed in position. A pulse from the generator 78 passes through a fixed delay 82, to ensure that the drumlike member 22 has reached a steady rest state, to provide the "test start" signal to the test set 51.

As the drumlike member 22 rotates, the devices are carried past the contacts 52–52 and 54–54 where a test is made. The results of the test are applied to a memory bank of shift registers 84, 85, 86, 87, 88 which, in turn, select the electromagnet to be operated in accordance with the results of the test. The test set 51 has its five bin command lines 72–76 each coupled, respectively, to the set inputs 53 of the five different shift registers 84–88. Each shift register 84, 85, 86, 87, 88 has a different number of stages.

In the preferred embodiment, wherein each electromagnet 41–45 is displaced one index position from another, the first one being located one index position past the test position, the five shift registers 84–88 have one, two, three, four, and five stages, respectively (FIG. 7).

The "test complete" signal from the test set 51 is coupled on the line 71 to a pair of pulse generators 89, 90. The output of the pulse generator 89 is coupled to the motor control 81 to start the motor 23, so that the drumlike member 22 can be indexed to a subsequent position. The output of the pulse generator 90 is coupled to shift each of the five shift registers 84–88.

Each of the shift registers 84–88 is designed so that upon the application of a set signal to the input of one of the shift registers on its bin command line, together with a shift signal from the pulse generator 90, the signal on the bin command line is stored into the first stage of the shift register. Upon subsequent pulses from the pulse generator 90, which produces the shift signal, the state that is stored in the first stage of a shift register is shifted, one at a time, to subsequent states of the shift register.

The output of the last stage of a shift register 84, 85, 86, 87, 88 is coupled to one input of a corresponding two-input AND gate 91, 92, 93, 94, 95. The output of the pulse generator 79 is coupled to the second input of all the gates 91–95. The output of each gate 91, 92, 93, 94, 95 is coupled to its corresponding electromagnet 41, 42, 43, 44, 45.

At a subsequent index position, light passes from the lamp 33a through the drumlike member 22 to the photoelectric cell 33b, activating the appropriate AND gate and energizing the corresponding electromagnet. The electromagnet, when energized, picks off the tested device 12 from the drumlike member 22 and deposits it into the grooved path 48 of the electromagnet housing 47. The device 12, assisted by the airflow, is directed along the output chute to the appropriate output bin.

Operation of an electromagnet causes it to pull the selected device from the notches 31–31 in the drumlike member 22 toward the corresponding output chute 58—62. The output chutes 58—62 are maintained at an angle to the horizontal so that the devices which are tested and pulled from the member into the chutes do not remain there but slide into the proper output bin in accordance with the test.

The following sequence of operations, generally, takes place: The carrier wheel has stopped and the test set has completed the test of a device 12, issuing a "bin command signal" and a "test complete" signal. A "shift" pulse is generated and the motor 23 is started. The wheel 22 moves and blocks light to the photocell 33b. Subsequently, the shift registers 84, 85, 86, 87, 88 shift, storing the information for the bin to which the tested device 12 is to be placed. The photocell 33b sees light and subsequently generates a "start test" pulse via the delay 82. A magnet pulse is generated by the generator 79 to the gates 91—95 and the motor 23 is stopped. The device is electromagnetically removed from the wheel into the proper chute to the corresponding output bin. The "test start" pulse is then generated, permitting testing to take place, and the cycle is renewed.

In one embodiment, wherein a number of various electrical tests are performed, an operating speed of about 25,000 units per hour is achieved. However, with fewer electrical tests, having shorter test durations, speeds as high as 90,000 units per hour can be obtained.

In a specific embodiment, the electromagnets 41, 42, 43, 44, 45 are positioned about three-sixteenths of an inch away from the drumlike member 22.

By using electromagnets for removing devices from a carrier wheel, very fast speeds are obtainable.

The only moving or wearing parts of any significance, in the embodiment described, is that of the motor 23 which is directly coupled by its axis to the drumlike member 22, and the test and probe camming leads which make contact with the device leads (which contacts, however, are self-cleaning against the peripheral surface of the drumlike member and, due to the spring bias, are continually self-adjusting). Hence, wear and maintenance of the embodiment described is substantially reduced over any of the known comparable prior art apparatus.

It is within the skill of the art to perform various modifications to the apparatus without departing from the spirit and scope of this invention. For example, in lieu of a rigid magnetic drumlike member, a flexible belt could be used.

A method of operation as set forth above can be performed by various means, including, in part, manually, wherein a device could be manually moved about an arc from a suspended position, tested, and removed by a localized force field from a position on the arc, and deposited into an output chute. Although the manual transportation of a device about an arcuate path is not the preferred mode contemplated by the inventors, it will be recognized that it falls within the scope of the invention as contemplated.

What We Claim is:

1. Apparatus for feeding, testing, and sorting articles, comprising:
    a. a carrier wheel for holding a number of said articles spaced about its periphery;
    b. means for testing one article at a time, at a test position in proximity with the periphery of said wheel, so that the tested article is classified in one of a plurality of different categories;
    c. means for indexing said wheel, at a rate of one article at a time, to said testing means;
    d. memory means coupled to said testing means for storing the classifications of tested articles;
    e. at least one force-field producing means in proximity to the periphery of said wheel, and spaced about the circumference thereof, for removing an article therefrom when energized; and f. means coupling said memory means to said force-field producing means for energizing such means to remove articles classified in a given category by the corresponding force-field producing means.

2. The apparatus as recited in claim 1 wherein said carrier wheel is oriented for rotation about a center axis aligned at an angle of 30° to 75° with the horizontal plane.

3. The apparatus as recited in claim 1 wherein element (e) includes a quantity of force-field producing means, one less in amount of categories than said plurality; said apparatus further comprising:
   g. mechanical stripping means, in cooperation with said wheel, for stripping held tested articles off said wheel which were not otherwise removed.

4. Apparatus for feeding, testing, and sorting articles, comprising:
   a. a drum for holding a number of said articles, equally spaced about its periphery;
   b. means for testing one article at a time, at a test position in proximity with the periphery of said drum, so that the tested article is classified in one of a plurality of different categories;
   c. means for indexing said drum, at a rate of one article at a time, to said testing means;
   d. a like plurality of shift registers, each of said shift registers having a different number of stages;
   e. means coupling said testing means to said shift registers for storing the tested classification of a tested article into the corresponding register;
   f. means for shifting the registers upon the indexing of the drum;
   g. a like plurality of force-field producing means in proximity to the periphery of said drum, spaced about the circumference thereof, for removing an article therefrom when energized; and
   h. means coupling the outputs of the shift registers to the corresponding force-field producing means for activation thereof.

5. Apparatus for feeding, testing, and sorting magnetically leaded devices, comprising;
   a. a stationary magnetic input bin for holding a number of magnetically leaded devices, said bin being adapted to substantially support each of said devices along axes parallel to each other, said axes being oriented at an angle lying between 30° and 75° with the horizontal plane;
   b. a drumlike member in cooperating relationship with said bin, being rotatable about an axis parallel to said parallel axes, and having magnetic means disposed about the circumferential periphery thereof for maintaining held devices in parallel alignment with said axes;
   c. means for rotating said member;
   d. means for testing one device at a time on the member;
   e. a plurality of output chutes having a low coefficient of friction;
   f. an electromagnet associated with each said chute, in proximity to the periphery of said member, each electromagnet having an axis parallel to said parallel axes; and
   g. means coupling said testing means to said electromagnets for activation thereof; whereby tested devices are electromagnetically removed from said member into appropriate output chutes, and are carried therealong due to the incline of the chutes with the horizontal plane.

6. Apparatus for feeding, testing, and sorting devices having a body and opposed axial magnetic leads, comprising:
   a. a stationary magnetic input bin for holding a number of paramagnetically leaded devices, said bin being adapted to substantially support each of said number of devices along axes parallel to each other, said axes being oriented at an acute angle lying between 30° and 75° with the horizontal plane;
   b. an opaque drumlike member in cooperating relationship with said bin and having a circumferential periphery and opposed ends, and being rotatable about an axis parallel to said parallel axes and having:
      1. a plurality of pairs of permanent magnets, for attracting and holding the leaded devices, imbedded in said member and equally spaced about the periphery of said member with the two magnets of each pair being aligned and having their radially extending poles oriented along a line parallel to said axes, the radially extending poles of each pair of magnets being of opposite polarity;
      2. grooved lead retaining and orienting means spaced along the periphery of said member, and associated with each pair of permanent magnets, for maintaining held devices in parallel alignment with said axes; and
      3. a like plurality of light transmitting passageways through said member from end to end and parallel to said axes, each of said passageways being oriented on a circular locus whose center coincides with the axis of rotation of said member, each one of said passageways being associated with a corresponding pair of said magnets;
   c. means for rotating said member intermittently;
   d. a light and photocell system associated with said drumlike member in cooperation with said light transmitting passageways;
   e. means coupling said system to said rotating means for stopping the rotation of said member when light passes through one of said passageways;
   f. means for rendering effective said rotating means to rotate upon receipt of a "shift" signal;
   g. a pair of power probe leads, associated at a test position, for engagement with a leaded device held by a pair of said permanent magnets;
   h. a pair of test probe leads, associated at said test position, for engagement with the leaded device engaged by the power probe leads;
   i. a test set for testing the leaded devices, coupled to said power probe leads and said test probe leads, said test set being operative to initiate testing upon a "test start" signal and being adapted to provide an "output bin command" signal upon the appropriate output thereof and a "test complete" signal upon completion of testing of each device;
   j. means coupled to said system for generating said "test start" signal when light passes through one of said passageways;
   k. a plurality of shift registers corresponding in number to the appropriate outputs of said test set, each of said registers having a different number of stages;
   l. pulse generating means for providing said "shift" signal to each of said shift registers upon receipt of a "test complete" signal;
   m. means coupling said "test complete" signal to said rendering means, for starting the rotation of said member;
   n. a plurality of output bins corresponding in number to said appropriate outputs of said test set;
   o. an output chute associated with each of said output bins;
   p. an electromagnet associated with each said chute in proximity to the periphery of said member, each electromagnet having an axis parallel to said parallel axes, each electromagnet, when energized, being adapted to remove its proximate device from said member so that the removed device falls into the associated chute;
   q. a plurality of two-input AND gates corresponding in number to said electromagnets, wherein:
      1. the output of each gate is coupled to its corresponding electromagnet;
      2. one input of each of said gates is activated in response to said system when light passes through one of said passageways; and
      3. the others of said inputs being coupled to corresponding outputs of said shift registers;
   r. an additional output chute;
   s. an additional output bin coupled to said chute;
   t. stationary stripping means, in cooperation with said grooved lead retaining and orienting means, for stripping held tested devices off said member which were not otherwise removed by one of said electromagnets, so that the stripped devices fall into the associated additional output chute; and u. means for directing an airflow, in a downwardly direction and parallel to said axes, between said member and said electromagnets, for assisting the removal of tested devices from said member.

7. A method of feeding, testing, and sorting articles, comprising:
   a. carrying a number of said articles about an arcuate path;
   b. testing one article at a time, at one location about said arcuate path, so that the tested article is classified into one of a plurality of different categories;
   c. storing the classifications of the tested articles; and
   d. developing a localized force-field to remove the tested articles from said path at a like plurality of positions along said path in accordance with the stored classifications of the tested articles.

8. A method of feeding, testing, and sorting articles comprising:
   a. carrying a number of said articles, equally spaced about an arcuate path;
   b. testing one article at a time, at a test position in proximity with said arcuate path, so that the tested article is classified into one of a plurality of different categories;
   c. indexing the articles, one article at a time, past said test position;
   d. storing separately and dynamically the classification of the tested articles for each category;
   e. shifting the classifications that are dynamically stored upon the indexing of the articles; and
   f. developing a localized force field to remove the tested articles from said path at a like plurality of positions along said path in accordance with the classifications that are dynamically stored.

9. A method of feeding, testing, and sorting magnetically leaded devices, comprising:
   a. suspending a number of magnetically leaded devices, at an input location, along axes substantially parallel to each other, said axes being oriented at an angle lying between 30° and 75° with the horizontal plane;
   b. transporting the devices at said input location about a circular arc, having a center axis parallel to said parallel axes, while maintaining the transported devices in parallel alignment with said axes;
   c. testing one device at a time, at a test position in proximity with the circular arc;
   d. electromagnetically removing the tested articles from said path at a plurality of positions along the path in accordance with the characteristics of the test; and
   e. depositing the removed articles onto output chutes, aligned with said axes, so that the removed articles travel therealong due to the incline of the chutes with the horizontal plane.

10. The method as recited in claim 9 further comprising:
   f. directing a flow of air in a downwardly direction parallel to said axes, and tangential to said arc, for assisting the removal of tested articles from said path.